United States Patent [19]

Okamura et al.

[11] Patent Number: 5,734,205
[45] Date of Patent: Mar. 31, 1998

[54] POWER SUPPLY USING BATTERIES UNDERGOING GREAT VOLTAGE VARIATIONS

[75] Inventors: Michio Okamura, Kanagawa; Masaaki Yamagishi, Tokyo, both of Japan

[73] Assignee: JEOL Ltd., Tokyo, Japan

[21] Appl. No.: 626,282

[22] Filed: Apr. 4, 1996

[51] Int. Cl.[6] .................................................. H02J 7/00
[52] U.S. Cl. .......................... 307/110; 307/71; 320/7; 320/16
[58] Field of Search ................ 307/110, 71, 52–54, 307/109, 62, 85–87, 19, 20; 320/1, 2, 7, 16; 363/101; 323/222, 224, 226, 282, 346

[56] References Cited

U.S. PATENT DOCUMENTS

| | | | |
|---|---|---|---|
| 3,459,957 | 8/1969 | Kelley | 307/71 |
| 3,748,500 | 7/1973 | Tam | 307/71 |
| 3,871,383 | 3/1975 | Lee | 307/71 |
| 4,788,452 | 11/1988 | Stanley | 307/71 |
| 5,121,046 | 6/1992 | McCullough | 307/71 |
| 5,498,951 | 3/1996 | Okamura et al. | 320/1 |
| 5,532,572 | 7/1996 | Okamura | 320/1 |

OTHER PUBLICATIONS

"A Basic Study on Power Storage Capacitor Systems", Michio Okamura, Trans. IEEE of JAPAN, vol. 115–B, No. 5, May, 1995, pp. 504–510. English language translation found at Electrical Engineering in Japan, vol. 116, No. 3, 1996, pp. 40–51.

Primary Examiner—Richard T. Elms
Attorney, Agent, or Firm—Webb Ziesenheim Bruening Logsdon Orkin & Hanson, P.C.

[57] ABSTRACT

A power supply using electric double layer capacitors whose output voltages undergo great variations. The power supply further includes first, second, and third switches for switching the capacitors from a parallel connection to a series connection, and a regulating circuit powered by the capacitors. As the output voltages from the capacitors drop, the regulating circuit switches the capacitors from the parallel connection to the series connection. For example, the switches are composed of semiconductor devices. The second and third switches are operated complementarily in relation to the first switch. Electric double layer capacitors producing low terminal voltages can be used. The step-up or step-down ratio can be made smaller. High voltage hazard can be avoided and the efficiency of the power supply can be improved.

12 Claims, 8 Drawing Sheets

Terminal Voltage Of Capacitor (%)

Step-down Converter

Battery Combination Output Voltage

POWER SUPPLY USING BATTERIES UNDERGOING GREAT VOLTAGE VARIATIONS

FIELD OF THE INVENTION

The present invention relates to a power supply using capacitor batteries undergoing great voltage variations, i.e., their terminal voltages drop as energy is taken from the capacitor batteries in a fully charged state.

BACKGROUND OF THE INVENTION

In recent years, it has been proposed to use electric double layer capacitors as electric power batteries. However, the output characteristics of batteries of this kind are greatly different from those of the prior art batteries. In particular, the terminal voltage of a lead-acid battery or of a nickel-cadmium battery is maintained substantially constant, irrespective of the amount of energy stored in the battery when electric power is being supplied from the battery to the load. On the other hand, the terminal voltage of an electric double layer capacitor varies greatly with the amount of energy stored in the battery.

FIG. 1 shows an example of the relation of the amount of energy stored in an electric double layer capacitor to the voltage developed across the terminals of the capacitor. It is assumed that the battery voltage is 100% (point a) when the stored energy is 100%. It can be seen that when the stored energy is 25%, the battery voltage drops to 50% (point b) of the value obtained when the battery is fully charged. Generally, for a DC power supply, the range of permissible voltage variations is about 20% or less. Where the battery voltage drops greater than 50%, most loads cannot operate satisfactorily. Therefore, if this electric double layer capacitor simply replaces the prior art battery, then the resulting voltage drop is so great that the battery can no longer be used as a DC power source.

Accordingly, it is common practice to place a constant-voltage source or constant-current source such as a switching regulator between the electric double layer capacitor acting as a power source and a load in practical applications.

FIG. 2 shows an example of the configuration of a circuit for regulating the output voltage by a step-up converter. FIG. 3 shows an example of the configuration of a circuit for regulating the output voltage by a step-down converter. FIG. 4 shows the characteristics of the configurations shown in FIGS. 2 and 3 when the load RL is connected with each converter. In FIG. 4, the battery voltage and the output voltage from each circuit are plotted against time.

Shown in FIGS. 2 and 3 are an electric double layer capacitor battery CB, a switching device SW, an inductive device L, a rectifying diode CR, an output capacitor C, a control circuit CTRL and the aforementioned load RL. In FIG. 2, the inductive device L, the rectifying diode CR, the switching device SW, the control circuit CTRL and the output capacitor C together form the step-up converter. Based on the control signal from the control circuit CTRL, the switching device SW connected to the output of the inductive device L switches the current flowing into the inductive device L, thus stepping up the voltage. Feedback control is provided by the control circuit CTRL so that the voltage developed across the output capacitor C is kept constant.

In FIG. 3, the output voltage is regulated by the step-down converter. Based on the control signal from the control circuit CTRL, the switching device SW connected on the input side of the inductive device L switches the current flowing into the inductive device L, thus stepping down the voltage. Feedback control is provided by the control circuit CTRL so that the voltage developed across the output capacitor C is held constant. In these configurations, a regulated constant voltage output is obtained despite a capacitor battery undergoing great voltage variations such as the electric double layer capacitor battery CB is used.

In the above-described configurations, it is assumed that the operating ranges of the step-up converter and step-down converter are 100%–25% of the fully charged battery voltage. As shown in FIG. 4, the output voltage is maintained constant until the output voltage from the battery CB reaches 25%. In the case of an electric vehicle, the load RL is a driving motor. In the case of a heating system, the load RL is a heater. In the case of indoor illumination, the load is a lamp. These loads might be used under a constant condition. In most cases, however, they are used while controlled automatically or manually.

For example, where the load is the motor of an electric vehicle, the motor is controlled according to driver's operation of the accelerator pedal. That is, the rotational speed of the motor assumes various values, ranging from 0 to its maximum speed. Where the load is a heater, the amount of heat generated is controlled finely, depending on variations of the ambient temperature and on the frequency at which the doors and windows of the room are opened, to maintain the room temperature constant. Where the load is indoor illumination, the intensity of illumination is adjusted according to the ambiance. When the illumination is put on or off, it is faded out.

In the above-described power supply such as a capacitor battery, as energy is taken from it as mentioned above, the voltage varies or drops greatly. In the case of the circuit for regulating the output voltage with the step-down converter, capacitor batteries are connected in series to obtain a voltage several times as large as the rated output voltage. For example, if 94% of the energy should be utilized, and if the rated output voltage is 12 V, a battery voltage four times as large as the rated output voltage, i.e., about 48 V, is required. This battery voltage must be applied to the step-down converter to produce a regulated rated output voltage of 12 V. If the battery voltage is 48 V under a fully charged state, the voltage is reduced down to one-fourth, so that an output voltage of 12 V is produced. When the battery voltage drops gradually and reaches 24 V, the step-down ratio is varied to one-half. When the battery voltage decreases to 12 V, the step-down ratio is changed to 1/1. By varying the step-down ratio in this way, the output voltage is maintained at 12 V.

Where the output voltage is regulated with the step-down converter as described above, battery voltages far exceeding actually used voltage values, i.e., battery voltages three or four times as large as the rated output voltage, are necessary. This is not very desirable from considerations of safety. For example, in the case of an electric vehicle operating at 200 V, batteries producing 800 V are needed. Such a high voltage places limitations on usable semiconductors. Also, it is necessary that the insulation distance be large enough to prevent high voltage hazard, such as insulation breakdown, smoke and fire, and a special insulating material may be required. Consequently, it is desired to reduce the battery voltage from an economical point of view, as well as from considerations of safety.

Where 94% of the energy is used by the circuit in which the output voltage is regulated with the step-up converter, the used voltage varies from the output voltage of 12 V to one-third of the output voltage, i.e., about 3 V. When the battery is in a fully charged state, if the battery voltage is 12 V, the step-up ratio is 1. As the battery voltage drops, the step-up ratio is varied. When the battery voltage reaches 6 V, the step-up ratio is increased to 2. Finally, when the battery voltage reaches 3 V, the step-up ratio in increased to 4. In this way, an output voltage of 12 V must be stably supplied.

In the case of the circuit using the step-up converter for regulating the output voltage, the conversion efficiency is generally inferior to that of the step-up converter. Furthermore, for utilizing 94% of the battery energy, the step-up ratio must be designed to 3 to 4. This further lowers the efficiency. It is not desirable to design the step-up converter so that it produces very great step-up ratios as described above in electric power applications. Where the step-up ratio is set to about 2, the more efficient method is available.

BRIEF DESCRIPTION OF THE DRAWINGS

Further features and other objects and advantages of the invention will be apparent from the following detailed description made with reference to the drawings in which.

DETAILED DESCRIPTION OF THE INVENTION

Figure 5:
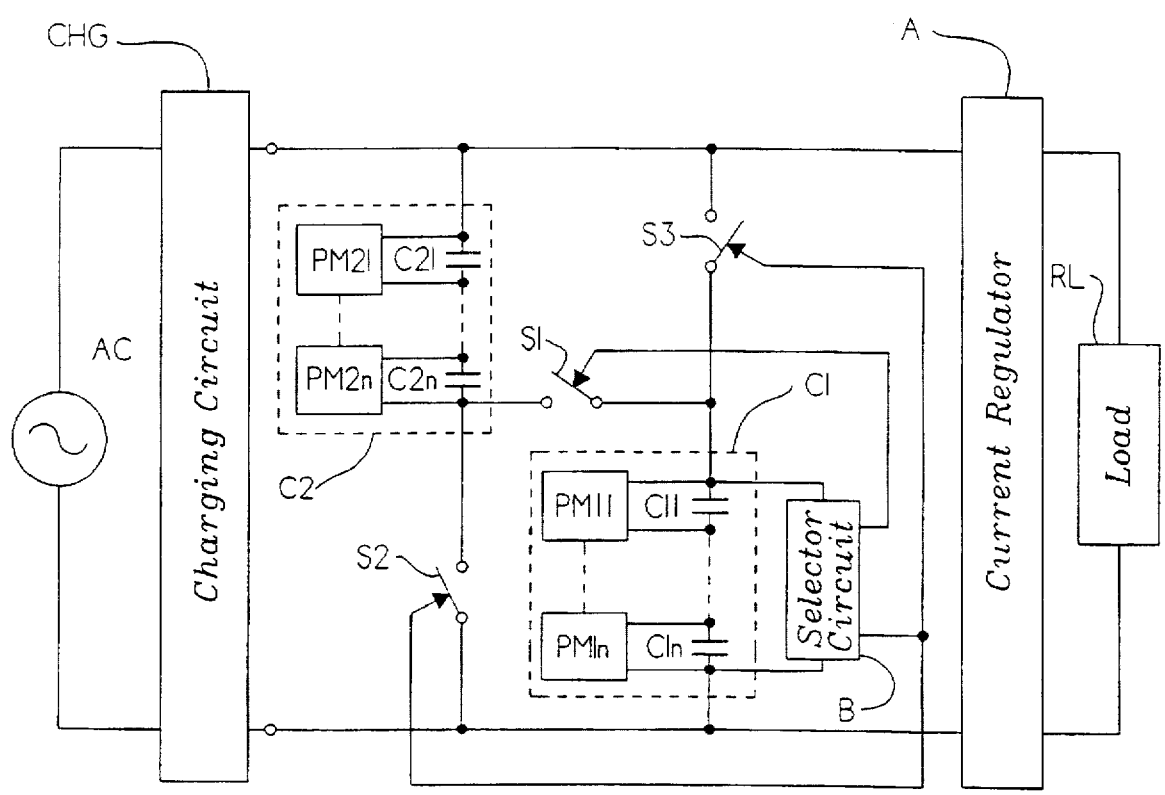
FIG. 5 is a circuit diagram of a power supply according to the present invention, the power supply using batteries undergoing great voltage variations.

Referring to FIG. 5, there is shown a power supply according to the present invention, the power supply using batteries undergoing great voltage variations. These batteries are capacitor batteries C1 and C2 having substantially identical characteristics. Each capacitor battery is fabricated by connecting a plurality of electric double layer capacitors C11–C1n or C21–C2n in series. Parallel monitor circuits PM11–PM1n and PM21–PM2n are connected in parallel with the electric double layer capacitors C11–C1n and C21–C2n, respectively. When the capacitor batteries C1 and C2 are recharged, they are connected in series or parallel with each other by a charging circuit CHG that is connected with an external power supply AC. Electric power stored in the capacitor batteries C1 and C2 by the charging is supplied to a load RL via a regulating circuit A.

Figure 6:
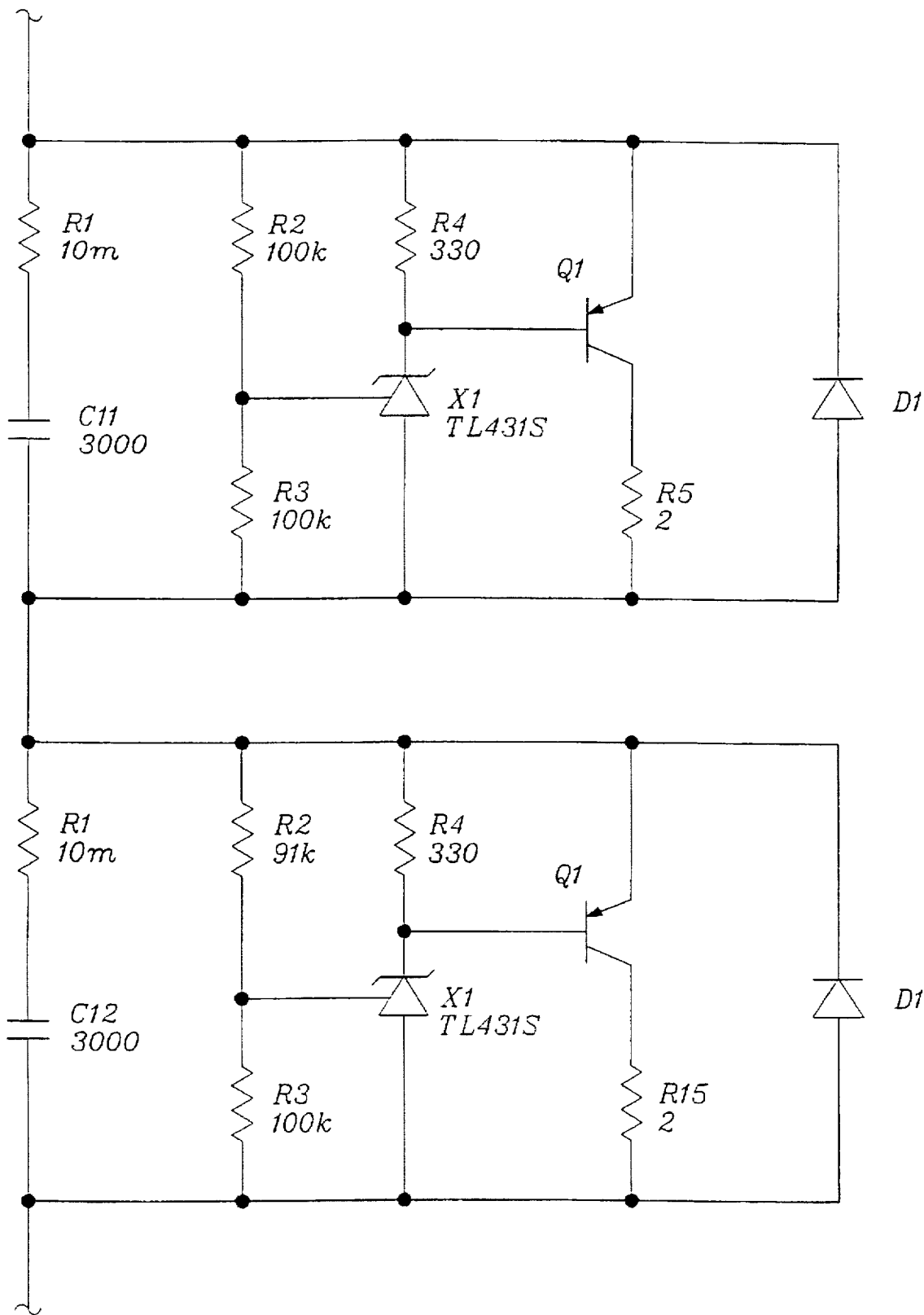
FIG. 6 is a circuit diagram of parallel monitor circuits used in a power supply according to the invention.

FIG. 6 is a circuit diagram of examples of the parallel monitor circuits. Essentially, the parallel monitor circuits are charging-limiting circuits connected in parallel with the electric double layer capacitors, respectively. Each charging-limiting circuit comprises three-terminal shunt regulator X1 consisting of an IC, a transistor Q1, a Schottky diode D1, and resistors R2–R5. When the capacitor battery C1 is electrically charged from the charging circuit CHG and becomes fully charged, the charging-limiting circuit causes the current to bypass the capacitor.

Referring back to FIG. 5, switches S1–S3 are used to switch the capacitor batteries C1 and C2 between a parallel connection and a series connection. The series combination of the capacitor battery C1 and the switch S3 is connected in parallel with the series combination of the capacitor battery C2 and the switch S2. The switch S1 when closed connects the junction of the capacitor battery C1 and the switch S3 with the junction of the capacitor battery C2 and the switch S2. Switch S1 and the switches S2 and S3 interlock with each other and operate in a complementary relation to the switch S1. The switches S1–S3 are switched to their open or closed states by a selector circuit B. This selector circuit B is connected in parallel with the capacitor battery C1, and the voltage developed across the terminals of the capacitor battery C1 is detected. In response to the detected output, the selector circuit B operates the switches S1–S3 in such a way that the capacitor batteries C1 and C2 are connected in parallel with each other when the voltage developed across the terminals of the capacitor battery C1 is in excess of half of the maximum voltage (i.e., the voltage produced when the battery is fully charged), and that the capacitor batteries C1 and C2 are connected in series with each other when the voltage is less than half of the maximum voltage.

In the case of an electric vehicle, the load RL is a driving motor. In the case of a heating system, the load RL is a heater. In the case of indoor illumination, the load is a lamp. The regulating circuit A is equipped with a switching means which is turned on and off by a pulse signal. For example, this regulating circuit A regulates the output voltage from the combination of the capacitor batteries C1 and C2 with the aforementioned step-up converter or step-down converter and supplies the regulated output voltage to the load RL. The regulating circuit A is a circuit for supplying a constant current by making use of switching action. For instance, the regulating circuit A is a switching-regulated constant-current DC/DC converter which operates at a high efficiency over a wide range of input voltages, e.g., 100%–20%. In this case, the regulating circuit A is preferably equipped with a voltage limiter for limiting the output voltage within certain limits.

The configuration shown in FIG. 5 is next described in detail. It is assumed that the rated voltage of the load RL is 12 V. A step-down converter is used as the regulating circuit A. We assume that 94% of the energy stored in the capacitor batteries C1 and C2 is taken. Capacitor batteries producing a maximum voltage of 24 V are employed as the capacitor batteries C1 and C2. A voltage varying from 24 V to 12 V is applied to the regulating circuit A, which produces a constant output voltage of 12 V. The conversion ratio (output voltage/input voltage) of the regulating circuit A is automatically adjusted from 1/2 to 1/1 in response to the input voltage.

First, the capacitor batteries C1 and C2 are charged by the charging circuit CHG with a constant current. When the switch S1 is closed and the switches S2 and S3 are opened, the capacitor batteries C1 and C2 are connected in series with each other and can be charged. Conversely, when the switch S1 is opened and the switches S2 and S3 are closed, the capacitor batteries C1 and C2 are connected in parallel with each other and can be charged.

Each of the capacitor batteries C1 and C2 is constructed by connecting plural electric double layer capacitors having the same rating in series with each other. However, these electric double layer capacitors become different in electrostatic capacitance and leakage resistance because of manufacturing tolerances and aging characteristics. If plural capacitors having different electrostatic capacitances are connected in series with each other and charged, then the capacitors are charged up to different voltages according to their electrostatic capacitances. It is considered that in order to prevent all the capacitors connected in series with each other from being charged up to more than the rated voltage, the whole charging operation must be stopped when the most heavily charged capacitor reaches the rated voltage. However, when the charging operation is stopped, the terminal voltages of the other capacitors may have not yet reached the rated voltage. In this method, therefore, the amount of electric power stored in the series-connected capacitors is small.

In contrast, in the present example, the parallel monitors are connected in parallel with the capacitors, respectively, which are in turn connected in series with each other. When the terminal voltage of one capacitor reaches the rated voltage during charging, the corresponding parallel monitor circuit causes the charging current to bypass the capacitor. In this way, the parallel monitor circuits cause the charging current to bypass the capacitors successively. Thus, the charging operation is completed. This assures that the capacitors connected in series are charged up to their respective rated voltages. Installation of these parallel monitor circuits yields especially conspicuous advantages where the number of the capacitors connected in series reaches several tens or more.

When the capacitor batteries C1 and C2 are charged up to their ratings by their respective parallel monitor circuits and the output voltage from the combination of the capacitor batteries C1 and C2 reaches the maximum value of 24 V, the charging by the charging circuit CHG is stopped. Then, discharging is started. At the beginning of the discharge, the selector circuit B opens the switch S1 and closes the switches S2 and S3. The capacitor batteries C1 and C2 are connected in parallel with each other. The output voltage 24 V from the battery combination is stepped down to 1/2 by the regulating circuit A. Electric power is fed to the load RL with a rated voltage of 12 V. As the energy is consumed by the load RL, the output voltage from the combination of the capacitor batteries C1 and C2 gradually drops. The regulating circuit A keeps applying the rated voltage of 12 V to the load RL while gradually varying the conversion ratio from 1/2 to 1/1 until the output voltage from the battery combination decreases from 24 V to 12 V.

When the output voltage from the combination of the capacitor batteries C1 and C2 drops to 12 V, 75% of the maximum energy stored in the capacitor batteries C1 and C2 is taken and supplied to the load. At the same time, the selector circuit B produces a selector signal to open the switches S2 and S3 and then to close the switch S1. As a consequence, the capacitor batteries C1 and C2 are switched from a parallel connection to a series connection. Therefore, 24 V is again applied to the regulating circuit A. In response to the increased input voltage, the regulating circuit A lowers the output voltage to 1/2 and keeps feeding electric power to the load with the constant rated voltage of 12 V.

As the energy is further expended by the load RL, the terminal voltages of the capacitor batteries C1 and C2 drop further. The regulating circuit A is able to apply the rated voltage 12 V to the load RL while varying the conversion ratio from 1/2 to 1/1 until the output voltage from the series combination of the capacitor batteries C1 and C2 drops to 12 V. At this time, the voltage developed across the terminals of each of the capacitors is 6 V. When the output voltage from the series combination of the capacitor batteries C1 and C2 is reduced by a factor or 4, i.e., reaches 6 V, it follows that 94% of the maximum energy is fed to the load.

The above-described charging and discharging process is merely a typical example. In a practical use, charging may be stopped when the capacitor batteries are not yet fully charged. For example, the output voltage from the series combination of the capacitor batteries C1 and C2 is below 12 V. In such a case, discharging is begun under the condition that the capacitor batteries C1 and C2 are connected in series.

Figure 1:
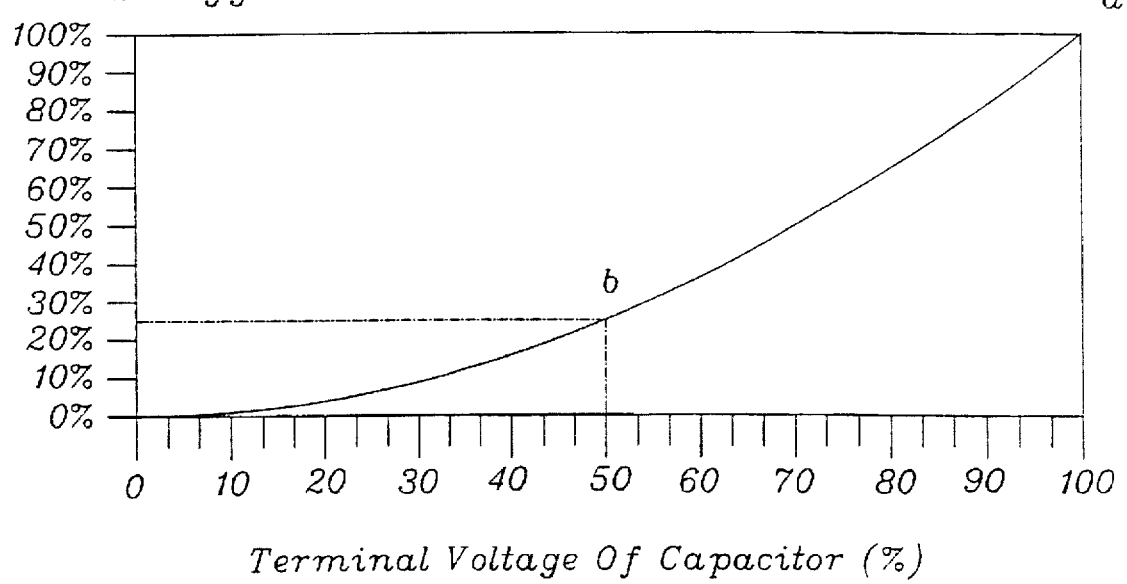
FIG. 1 is a graph illustrating the manner in which the terminal voltage of an ordinary electric double layer capacitor varies as the amount of energy stored in the capacitor is changed.
Figure 2:
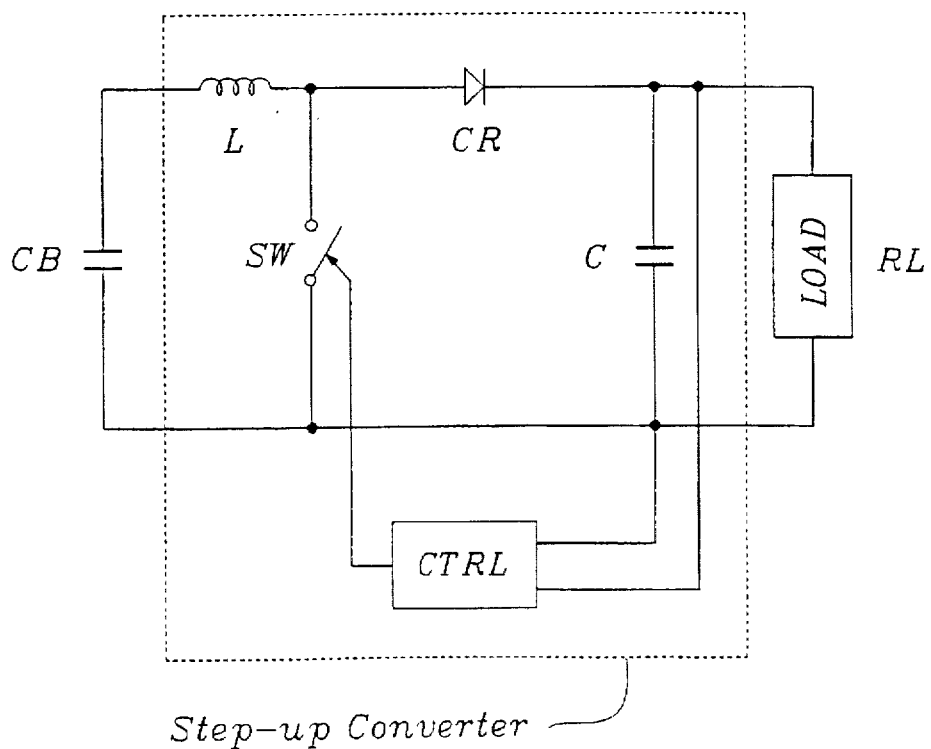
FIG. 2 is a circuit diagram of a conventional regulating circuit having a step-up converter.
Figure 3:
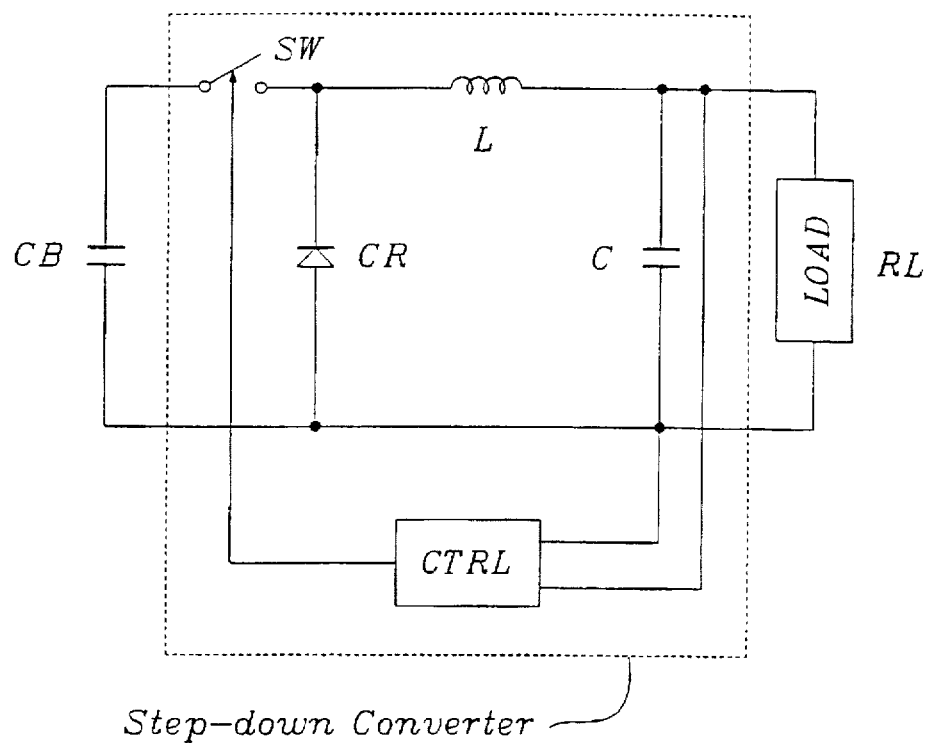
FIG. 3 is a circuit diagram of another conventional regulating circuit having a step-down converter.
Figure 4:
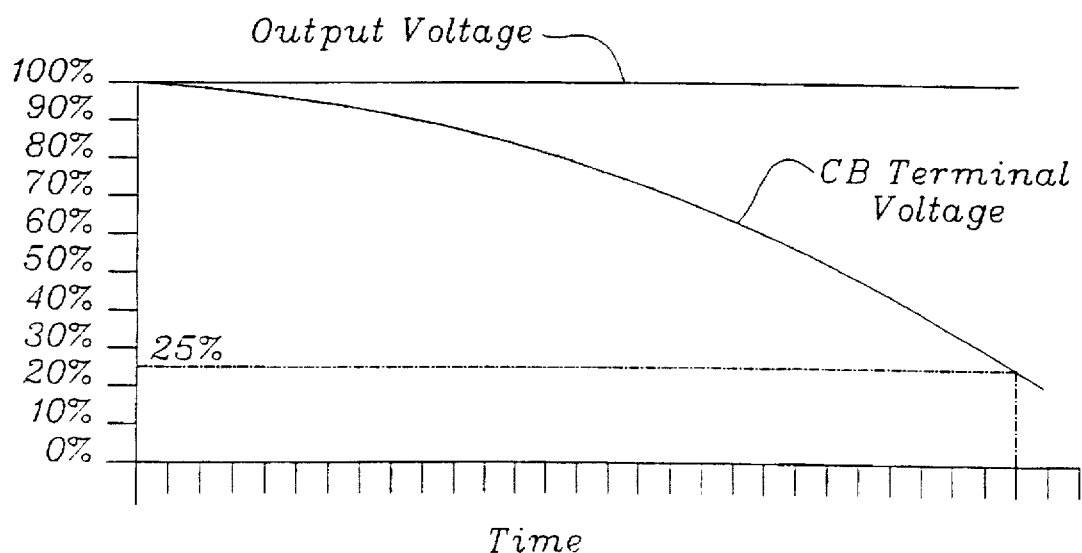
FIG. 4 is a graph illustrating the output voltage characteristics of the circuits shown in FIGS. 2 and 3, as well as the terminal voltage characteristics of the battery CB included in each circuit.

In the conventional configuration shown in FIG. 3, if the voltage developed across the capacitor battery CB when it has been fully charged is selected to be 48 V so that the voltage developed when 94% of the energy is taken becomes equal to the load rated voltage of 12 V, then the regulating circuit A must vary the conversion ratio widely from 1/4 to 1/1 in order to produce an output voltage of 12 V in response to the input voltage varying from 48 V to 12 V. Today, it is inevitable that the circuit configuration for varying the step-down ratio within the wide range as described above has a poor efficiency and is expensive.

In this respect, in the present example, the capacitor batteries C1 and C2 are connected in parallel with each other by the switches S1–S3 between the interval beginning with full charging and ending with the instant when they are discharged up to the conversion ratio of 1/2. Subsequently, the batteries are connected in series with each other. This makes it possible to use a regulating circuit whose conversion ratio ranges from 1/2 to 1/1. This regulating circuit A has a narrow range of conversion ratios and so a high conversion efficiency can be obtained. Furthermore, the maximum input voltage is half of 48 V, i.e., 24 V. Therefore, greater degrees of freedom are given in selecting the semiconductors used in the regulating circuit A and in designing it. This can lead to a cost reduction.

It is assumed that the power supply is used on an electric vehicle. Where regenerative braking action is produced by the electric vehicle, if the capacitor batteries C1 and C2 which are connected either in parallel or in series are discharging, charging current is fed into them from the outside or from the load. The capacitors forming the capacitor batteries C1 and C2 tend to have different charging voltages. In the present example, the parallel monitors are connected in parallel with their respective capacitors. If the above-described situation occurs, overcharging which would normally produce more than the rated voltages of the capacitors is prevented. Variations in the charging voltages can be suppressed.

FIGS. 7–10 show other power supplies according to the invention, the power supplies using batteries undergoing great voltage variations. Shown in these figures are switches S5, S6, diodes CR1–CR3 and switching devices Q1–Q3.

Figure 7:
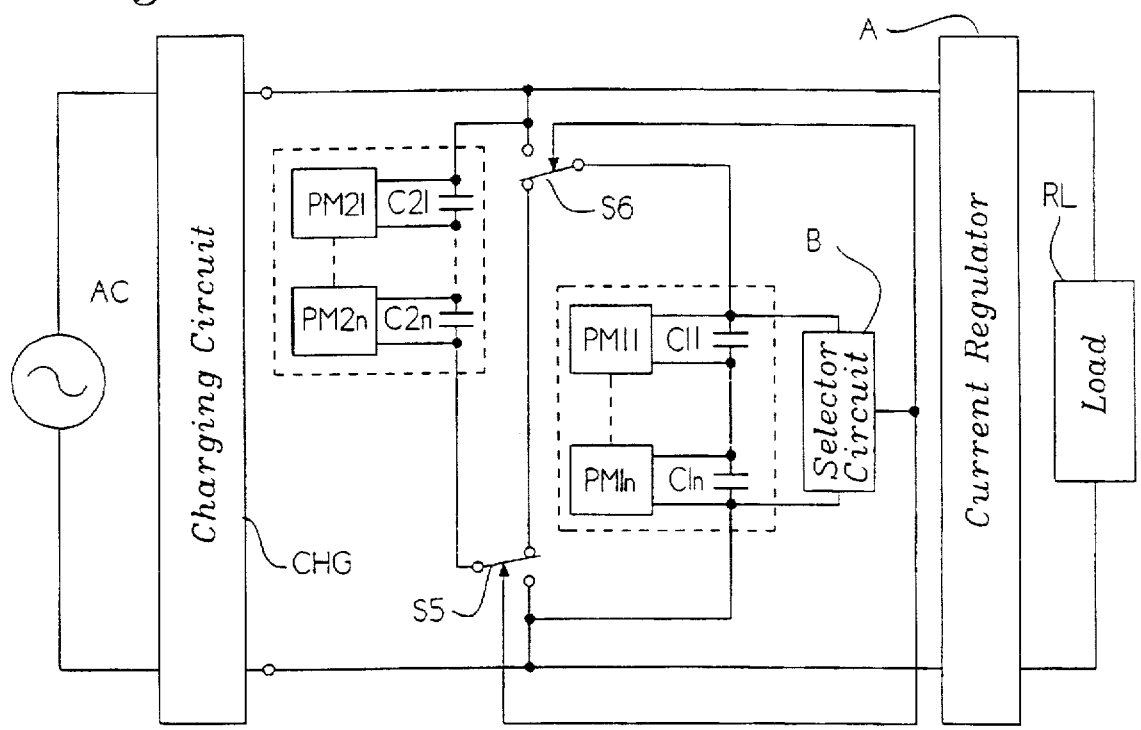
FIG. 7 is a circuit diagram of another power supply according to the present invention, the power supply using batteries undergoing great voltage variations.

In the example shown in FIG. 7, the switches S5 and S6 comprising transfer contacts and interlocking with each other are used. In the example shown in FIG. 5, the switch S1 must operate in a complementary relation to the switches S2 and S3. The example of FIG. 7 is relieved of this condition. That is, the switches can be switched at any arbitrary time.

Figure 8:
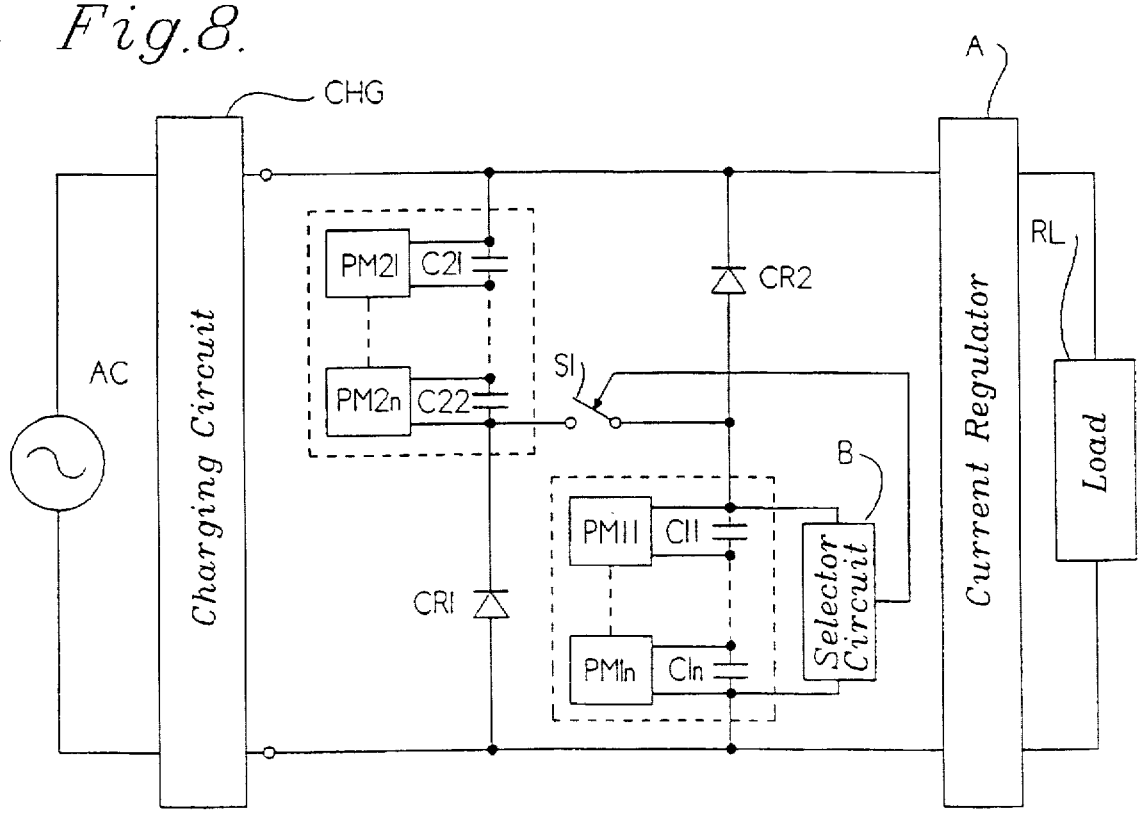
FIG. 8 is a circuit diagram of a further power supply according to the present invention, the power supply using batteries undergoing great voltage variations.

The example shown in FIG. 8 is similar to the example shown in FIG. 5 except that the switches S2 and S3 are replaced by the diodes CR1 and CR2. In FIG. 8, the capacitor batteries C1 and C2 are switched between the series connection and the parallel connection simply by operating the switch S1.

Figure 9:
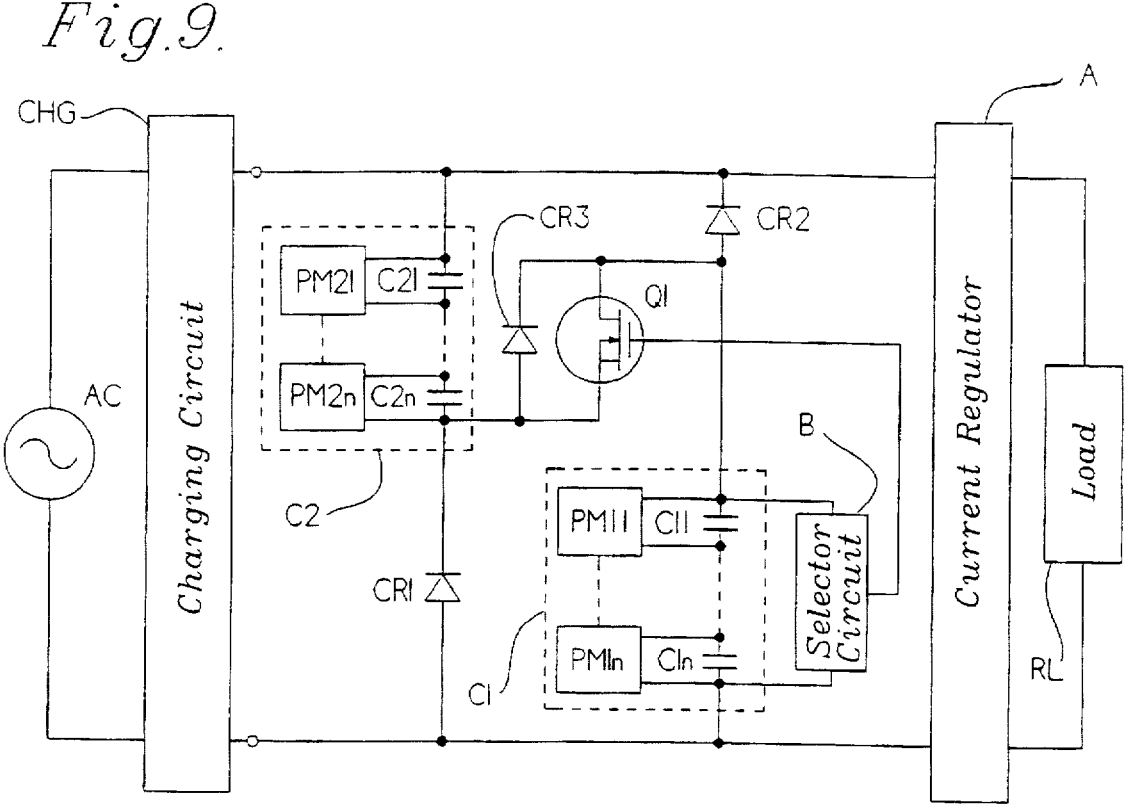
FIG. 9 is a circuit diagram of yet another power supply according to the present invention, the power supply using batteries undergoing great voltage variations.

The example shown in FIG. 9 is similar to the example shown in FIG. 8 except that the switch S1 is replaced by the switching device Q1 and the parallel diode CR3. The switching device Q1 consists of an N-channel MOSFET. The drain of this MOSFET is connected with the anode of the diode CR3, while the source is connected with the cathode of the diode CR3. When an ON signal is applied to the gate of the switching device Q1, it conducts, thus connecting the capacitor batteries C1 and C2 in series with each other. When an OFF signal is applied to the gate, the switching device is biased to cut off. As a result, the capacitor batteries C1 and C2 are connected in parallel with each other.

When the capacitor batteries C1 and C2 are charged, electrical current would normally flow from the parasitic diode of the switching device Q1. The diode CR3 is connected to cause this charging current to bypass the batteries C1 and C2. Depending on the specifications of the switching device Q1, the diode CR3 can be dispensed with. The diodes automatically perform switching action analogous to the action of the switches S2 and S3. Furthermore, the diodes CR1 and CR2 act also as reverse-blocking diodes which are needed when large capacity capacitors are connected in parallel.

Figure 10:
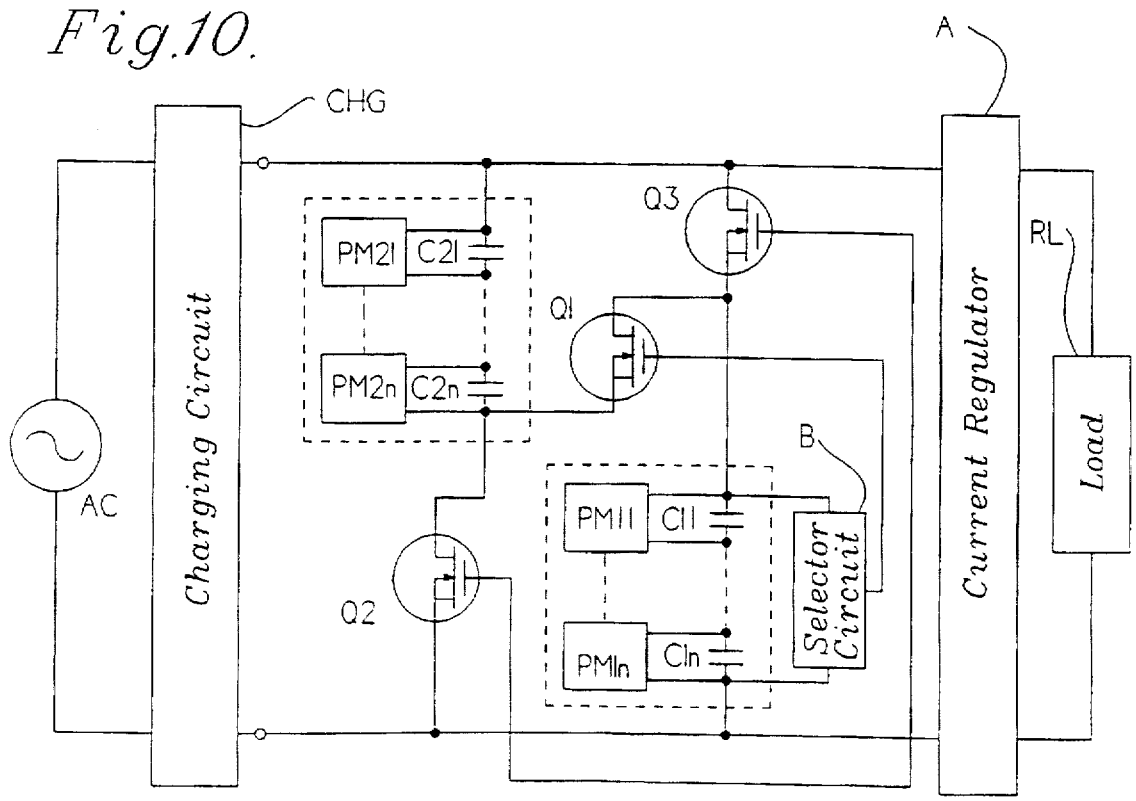
FIG. 10 is a circuit diagram of still another power supply according to the present invention, the power supply using batteries undergoing great voltage variations.

The example shown in FIG. 10 is similar to the example shown in FIG. 5 except that the switches S1–S3 are replaced by semiconductor switching devices Q1–Q3 consisting of N-channel MOSFETs. In this example, the circuit loss can be made smaller than the forward loss due to the diodes CR1 and CR2. This example has the disadvantage that the circuit configuration is complicated because two kinds of gate signals are necessary. However, this disadvantage is overcome by the advantage that the capacitor batteries C1 and C2 can be charged with a low voltage by connecting them in parallel with each other.

The regulating circuit A is not limited to the prior art structure in which the output voltage is regulated like a DC current with a step-up or step-down converter. Various other circuits can also be used as the regulating circuit A. For instance, a detected value is compared with a target value, thus producing an error signal. A pulse signal is produced according to the error signal. A switching means is turned on and off in response to the error signal. The maximum voltage produced when batteries are fully charged is set higher than the rated voltage of the load. The load voltage of load current can be controlled over a wide range of battery voltages, i.e., until the battery voltages drop to the rated voltage of the load, thus causing the switching means to conduct continuously. An example of this construction is given below.

Figure 11:
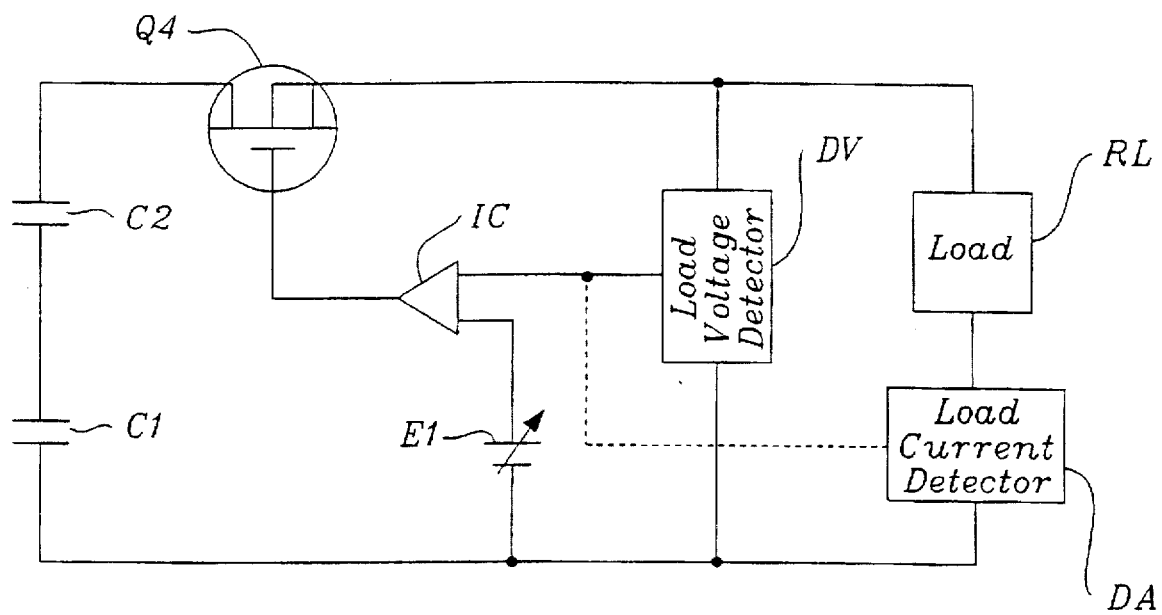
FIG. 11 is a circuit diagram of a regulating circuit used in a power supply according to the invention.
Figure 12:
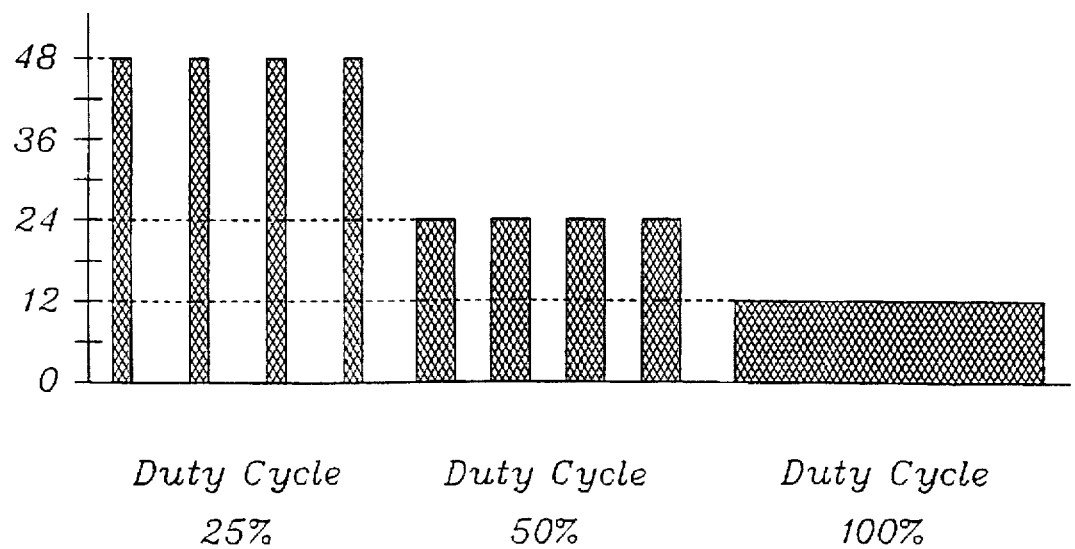
FIG. 12 is a waveform diagram of pulses subjected to pulse-width modulation in a power supply according to the invention.
Figure 13:
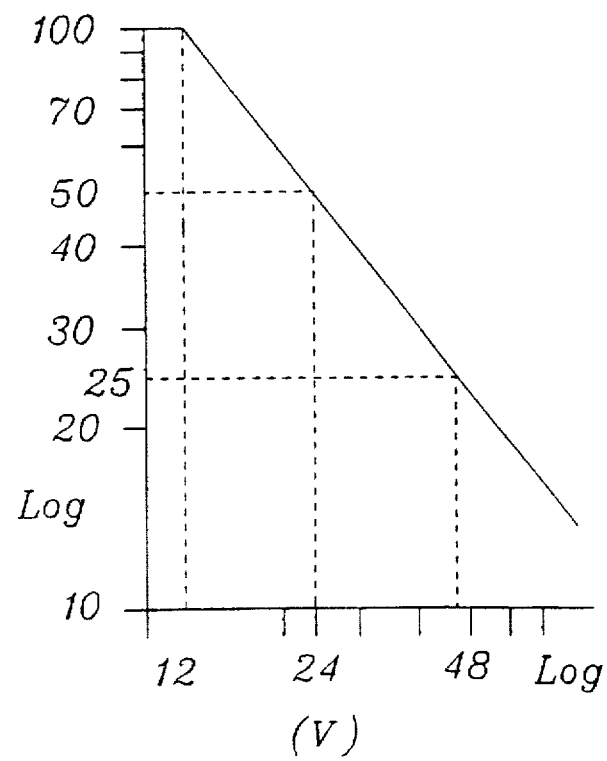
FIG. 13 is a graph illustrating the relation of the duty cycle of pulses to the output voltage from a battery combination where the pulses are pulse-width modulated in a power supply according to the invention.

FIG. 11 shows an example of construction of the regulating circuit. FIG. 12 shows examples of pulse waveforms subjected to pulse-width modulation. FIG. 13 shows the relation of the duty cycle of pulses to the output voltage from a battery combination when the pulses are pulse-width modulated.

The structure for switching the connection between the parallel connection and the series connection as shown in FIGS. 5 and 7–10 is omitted from FIG. 11. FIG. 11 is schematically shown under the condition that capacitor batteries C1 and C2 are connected in series with each other. The capacitor batteries C1 and C2 are each made up of electric double layer capacitors. Also shown are a switching control circuit IC, a switching means Q4, a control voltage-setting means E1, a load voltage-detecting portion DV, a load current-detecting portion DA, and a load RL. The switching means Q4 cuts off the current flowing into the load RL, depending on the output voltage from the combination of the electric double layer capacitor batteries C1 and C2. For example, the switching means Q4 consists of a MOSFET. The regulating circuit consists essentially of the series combination of the capacitor batteries C1 and C2, the load RL, and the switching means Q4. A load voltage developed across the load RL is detected by the load voltage-detecting portion DV. The switching control circuit IC accepts the detected load voltage and compares this with the output from the control voltage-setting portion E1 which is a target value, thus producing an error signal. In response to this error signal, the switching means Q4 is controlled by pulse-width modulation or pulse-frequency modulation. If the load current-detecting portion DA is connected with the input of the switching control circuit IC instead of the load voltage-detecting portion DV, the load current is controlled instead of the load voltage. The load voltage or load current can be controlled to any arbitrary value by varying the output from the control voltage-setting portion E1 according to the target value.

Where the load RL is an air-conditioning device or illumination device, the output signal from a thermometer or illuminance meter is furnished to the switching control circuit IC. The control voltage-setting portion E1 sets a target temperature or target illuminance. The above-described load voltage-detecting portion DV and load current-detecting portion DA detect the effective value or mean value of the voltage developed across the terminals of the load controlled by the switching action and the effective value or mean value of the switching current flowing through the load, respectively. There exists no inductance for storing energy, unlike conventional step-up and step-down converters. Hence the load is directly controlled. Similarly, in the case of detection of electric power value applied to the load, the effective value or mean value is needed. However, neither the effective value nor mean value is necessary where the detected matter is averaged by the time constant of the load itself such as temperature and illuminance.

The manner in which the switching means Q4 is controlled by the switching control circuit IC is next described in detail. When electric power is supplied to the load RL, the output voltage from the combination of the electric double layer capacitor batteries C1 and C2 decreases according to the amount of the fed electric power. If pulse-width modulation is utilized, the switching control circuit IC increases the duty cycle as shown in FIG. 12 according to the output voltage and increases the pulse width. In this way, the switching means Q4 is controlled in such a way that the voltage or current fed to the load becomes equal to the target value. If pulse-frequency modulation is employed, the pulse repetition frequency is increased, and the switching means Q4 is controlled in such a manner that the effective value or mean value of the voltage or current fed to the load is kept constant.

Where pulse-width modulation is utilized, it is assumed that a voltage of 12 V is set by the voltage-setting portion 12. As shown in FIG. 12, when the output voltage from the combination of the capacitor batteries C1 and C2 is 48 V, the duty cycle drops to 25%. When the output voltage is 24 V, the duty cycle decreases down to 50%. When the output voltage is 12 V, the duty cycle becomes 100%. That is, the duty cycle is the ratio of the battery combination output voltage to the set value, as shown in FIG. 13.

Figure 14:
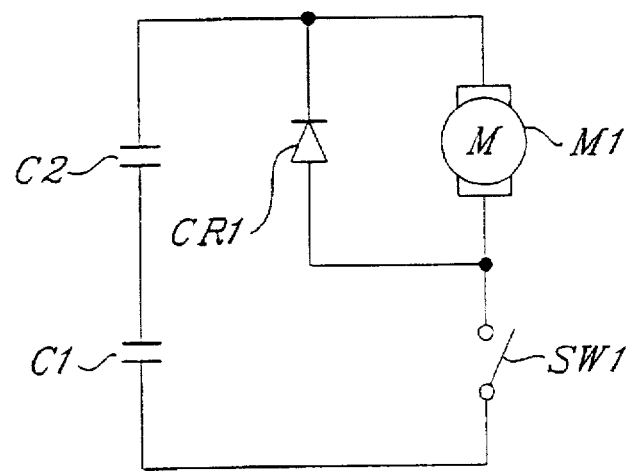
FIG. 14 is a circuit diagram of regulating circuits used in a power supply according to the invention.

FIG. 14 illustrates the principle of operation of the regulating circuit. Although the structure of the regulating circuit shown in FIG. 11 is simple, it is necessary to make the battery combination output voltage several times as large as the continuous-duty rated voltage of the load in order to operate the regulating circuit effectively. Therefore, a voltage smoothed by the reactor of the step-down converter, capacitors, and diodes is not applied to the load. Rather, a voltage in the form of a pulse twice as large as the rated value is applied. Obviously, it is necessary to fabricate the load in such a way that none of electric discharge, leakage, and deterioration are produced internally. Where the load is a winding, it is necessary to manufacture it, taking account of the insulating material and insulating distance. For example, the load has specifications including a continuous-duty rated voltage of 12 V and a maximum rated voltage of 25 V.

Referring to FIG. 14, a DC motor M1 has a continuous-duty rated voltage of 12 V. A commutation (fly-back) diode CR1 is connected in parallel with the motor M1. If the switching means Q4 is varied from a conducting state to a cutoff state, the motor current can be kept supplied through the commutation diode CR1. It is assumed that when each of the capacitor batteries C1 and C2 is fully charged, a voltage of 12 V is developed across the battery. The output voltage from the series combination of the capacitor batteries C1 and C2 is 24 V. In this example, the usable range of the output voltage lies from 24 V to 12 V. If the connection-switching means shown in FIGS. 5 and 7-10 is used, about 94% of the battery energy can be used. Where pulse-width modulation is performed, using the switching means Q4, the motor is driven with pulses having a duty cycle of 50%, provided that the output voltage from the series combination of the batteries is 24 V, because the continuous-duty rating of the motor M1 is 12 V. Because of this operation, it substantially follows that the voltage of 12 V is impressed on the motor Mi. Where the output voltage of the combination of the batteries is 12 V, the motor M1 having a continuous-duty rated voltage of 12 V can be driven by applying pulses having a duty cycle of 100%. The output voltage from the battery combination and the waveform of the driving pulses are shown in FIG. 12. The ratio of the duty cycle to the output voltage from the battery combination is shown in FIG. 13. In this way, if the output voltage from the battery combination varies from 24 V to 12 V, the switching means Q4 can control the load over 0-100% range within the duty cycle shown in FIG. 13. The insulation between the used motor M1 and the casing or between the winding and ground is strengthened so that the breakdown voltage is 24 V.

In the above-described example, the load RL is a parallel combination of an inductive load such as an electric motor and a diode. In this case, if a switching frequency satisfying continuous-duty load current conditions is used, then the applied voltage is the average value of the pulse waveform. Therefore, if the output voltage E from the combination of the electric double layer capacitor batteries C1 and C2 is halved, the pulse width can be increased twofold in the case of pulse-width modulation. In the case of pulse-frequency modulation, the pulse-repetition frequency is doubled. Accordingly, if the output voltage from the battery combination varies widely from 100% to 25%, there is no need for an apparatus which obtains a regulated output DC voltage from the combination and feeds the DC voltage to the load, by setting the battery combination output voltage greater than the continuous-duty rated voltage of the load and switching the connection of the capacitor batteries or varying the pulse width or pulse-repetition frequency according to the gradually decreasing output voltage from the battery combination.

It is to be understood that the present invention is not limited to the above examples but rather various changes and modifications are possible. In the above examples, the power supply uses electric double layer capacitors. Obviously, other capacitors can also be employed. Examples include: batteries whose terminal voltages are varied greatly as the electric source is consumed; and capacitors using conductive polymers such as polyaniline and polyacen which store electric charge. Also, a power supply using a step-down converter has been described. A power supply employing a step-up converter can be similarly used at a high efficiency since the step-up ratio can be varied up to 2. It is obvious that various output-regulating circuits including the prior art step-down converter and step-up converter may be used in combination.

As can be understood from the description provided thus far, a plurality of batteries undergoing great voltage variations are connected. As the terminal voltages drop, they are switched from a parallel connection to a series connection. A switching means powered by these batteries controls the voltage or current fed to a load. Where each battery is made of electric double layer capacitors, as energy is taken from the batteries under a fully charged state, the voltage gradually drops. Even in this power supply, batteries producing lower terminal voltages can be used. Consequently, if either a step-down converter or a step-up converter is used as a control means, the step-up or step-down ratio can be made smaller. Hence, the safety is improved. Furthermore, the efficiency of the power supply can be enhanced. Moreover, the greater degrees of freedom are given in selecting used semiconductor devices and in designing the power supply. Hence, the economy of the apparatus can be improved.

Having thus described our invention with the detail and particularity required by the Patent Laws, what is desired protected by Letters Patent is set forth in the following claims.

What is claimed is:

1. A power supply using batteries undergoing great voltage variations, said power supply comprising:
 a plurality of batteries whose terminal voltages drop as energy is taken from said batteries;
 a switching means for switching said batteries from a parallel connection to a series connection as said terminal voltages drop;
 a pulse-width modulated switching means for switching voltage from the series or parallel connected batteries to a load;
 a control means powered by said batteries and acting to control the pulse-width modulated switching means, so that an effective value of voltage or current fed to the load from the batteries connected in series is kept constant in response to changes in the terminal voltages of the batteries and an effective value of voltage or current fed to the load from the batteries connected in parallel is kept constant in response to changes in terminal voltages of batteries.

2. The power supply of claim 1, wherein said plurality of batteries are each composed of a plurality of capacitors connected in series.

3. The power supply of claim 2, wherein said capacitors are electric double layer capacitors.

4. The power supply of claim 2, wherein charging-limiting circuits are connected in parallel with said capacitors, respectively, connected in series.

5. The power supply of any one of claims 1–4, wherein said switching means is equipped with a detection means for sensing that the terminal voltage of one of said batteries has dropped to a given level, and wherein said batteries are switched from the parallel connection to the series connection according to an output signal from said detection means.

6. The power supply of claim 1, wherein said control means is equipped with a step-down converter.

7. The power supply of claim 1, wherein said control means is equipped with a step-up converter.

8. A power supply using batteries undergoing great voltage variations, said power supply comprising:

a plurality of batteries whose terminal voltages drop as energy is taken from said batteries;

a switching means for switching said batteries from a parallel connection to a series connection as said terminal voltages drop;

a pulse-width modulated switching means for switching voltage from the series or parallel connected batteries to a load; and a control means powered by said batteries and acting to control the pulse-width modulated switching means, wherein said control means detects an effective or mean value of the voltage or current fed to the load and controls said pulse-width modulated switching means according to the detected value.

9. A power supply using batteries undergoing great voltage variations, said power supply comprising:

a plurality of batteries whose terminal voltages drop as energy is taken from said batteries;

a switching means for switching said batteries from a parallel connection to a series connection as said terminal voltages drop;

a pulse-width modulated switching means for switching voltage from the series or parallel connected batteries to a load; and a control means powered by said batteries and acting to control the pulse-width modulated switching means, wherein:

(a) said switching means has first, second and third switches;

(b) a series combination of one of said batteries and said second switch is connected in parallel with a series combination of the other battery and said third switch;

(c) said first switch is connected between the junction of the one of said batteries and said second switch and the junction of the other battery and said third switch; and (d) said second and third switches are operated complementarily to said first switch.

10. The power supply of claim 9, wherein said plurality of batteries are each composed of a plurality of capacitors connected in series.

11. The power supply of claim 10, wherein said capacitors are electric double layer capacitors.

12. The power supply of claim 10, wherein charging-limiting circuits are connected in parallel with said capacitors, respectively, connected in series.

* * * * *